United States Patent
You et al.

(10) Patent No.: US 11,108,733 B2
(45) Date of Patent: Aug. 31, 2021

(54) METHOD OF INTERCONNECTING BETWEEN NETWORK APPLICATIONS AND A TYPE OF NETWORK ACCESS APPARATUS

(71) Applicant: SENSEBERG TECHNOLOGY CO., LTD., Shenzhen (CN)

(72) Inventors: Jun You, Shenzhen (CN); Jun Wang, Shenzhen (CN)

(73) Assignee: SENSEBERG TECHNOLOGY Co., LTD., Shenzhen (CN)

( * ) Notice: Subject to any disclaimer, the term of this patent is extended or adjusted under 35 U.S.C. 154(b) by 0 days.

(21) Appl. No.: 16/923,801

(22) Filed: Jul. 8, 2020

(65) Prior Publication Data
US 2020/0336456 A1 Oct. 22, 2020

Related U.S. Application Data

(63) Continuation-in-part of application No. PCT/CN2018/101756, filed on Aug. 22, 2018.

(30) Foreign Application Priority Data

Mar. 8, 2018 (CN) .......................... 201810189452.7

(51) Int. Cl.
*H04L 29/12* (2006.01)
*H04L 12/28* (2006.01)
*H04L 29/06* (2006.01)

(52) U.S. Cl.
CPC ...... *H04L 61/2571* (2013.01); *H04L 12/2856* (2013.01); *H04L 61/1541* (2013.01); *H04L 61/2517* (2013.01); *H04L 63/126* (2013.01)

(58) Field of Classification Search
CPC ............. H04L 61/2571; H04L 61/1541; H04L 61/2517; H04L 12/2856; H04L 67/06;
(Continued)

(56) References Cited

U.S. PATENT DOCUMENTS 7,031,327 B2 * 4/2006 Lu ..................... H04L 29/12132
370/401
10,623,469 B2 * 4/2020 Sun ..................... H04L 67/2814
(Continued)

FOREIGN PATENT DOCUMENTS

CN 102088422 A 6/2011
CN 104796500 A 7/2015
(Continued)

OTHER PUBLICATIONS

Kubbard, "A Study of SSL Proxy attacks on Android and iOS mobile applications", IEEE 11th Consumer Communications and Networking Conference (CCNC), Jul. 2014.*
(Continued)

*Primary Examiner* — Todd L Barker
(74) *Attorney, Agent, or Firm* — Westman, Champlin & Koehler, P.A.; Steven M. Koehler

(57) ABSTRACT

The present disclosure provides a method of interconnecting between network applications and a type of network access apparatus, the method includes: acquiring a network address and a network application Port Number of a first network device and first validation information; receiving a network address and an application Port Number of a second network device and second validation information according to the network address and the network application Port Number of the first network device and the first validation information; validating whether the network address and the application Port Number of the second network device is connection information requested by the network application of the first network device according to the second validation information; if yes, connecting the network application of the first network device with the network application of the second network device according to the network address and the network application Port Number of the second network device.

8 Claims, 10 Drawing Sheets

(58) Field of Classification Search
CPC . H04L 67/141; H04L 67/2814; H04L 63/065; H04L 63/0823
See application file for complete search history.

(56) References Cited

U.S. PATENT DOCUMENTS

| | | | | |
|---|---|---|---|---|
| 2005/0226248 | A1* | 10/2005 | Modi | H04L 67/42 370/395.5 |
| 2017/0012941 | A1* | 1/2017 | Subbarayan | H04L 41/0813 |
| 2019/0020723 | A1* | 1/2019 | Kumar | H04L 67/28 |
| 2020/0028848 | A1* | 1/2020 | Gupta | H04L 63/0823 |

FOREIGN PATENT DOCUMENTS

| | | |
|---|---|---|
| CN | 107463453 A | 12/2017 |
| JP | 2004260654 A | 9/2004 |

OTHER PUBLICATIONS

Alshammari, "Security Threats and Challenges in Cloud Computing", IEEE 4th International Conference on Cyber Security and Cloud Computing, Jun. 2017.*

International Search Report dated Nov. 28, 2018, for corresponding International Application No. PCT/CN2018/101756, filed Aug. 22, 2018.

* cited by examiner

METHOD OF INTERCONNECTING BETWEEN NETWORK APPLICATIONS AND A TYPE OF NETWORK ACCESS APPARATUS

CROSS-REFERENCE TO RELATED APPLICATION

This application is a continuation-in-part of PCT Patent application Ser. No. PCT/CN2018/101756, filed on Aug. 22, 2018, which claims priority to Chinese patent application No. 201810189452.7, filed on Mar. 8, 2018, the content of which is incorporated herein by reference in entirety.

TECHNICAL FIELD

The present disclosure relates to the technical field of network communication, and particularly to a method of interconnecting between network applications and a type of network access apparatus.

BACKGROUND

With the rapid development of network technologies, the application of Internet is becoming increasingly widespread and there are more and more devices accessing the Internet. A network connection is implemented by an existing network application device through a network card, a wireless Wi-Fi (Wireless Fidelity) module, or a type of network access apparatus of a mobile network module. When the network application device is connected with other network application device through the network, the network access apparatus is used to transmit data to the connected network application device so as to perform network communication.

The existing network access apparatus must acquire the network address of the connected device first, however, it is usually difficult to acquire the network address of the connected device due to problems of the operating system, unreasonable device configuration or the environment. Furthermore, network connection between the existing network applications is realized through identification of Port Numbers, Port Numbers are usually randomly allocated to other web applications provided by web applications in addition to some standard network applications such as WWW (World Wide Web) web services, FTP (File Transfer Protocol) network services, so that a corresponding web applications cannot be identified by Port Numbers; meanwhile, there is strong coupling between the manner of mutual network connection between the existing network applications, and the network address, and the Port Number, this strong coupling limits an interconnection capability of the same network application between different network devices and an interconnection capability of different network applications between different network devices.

Technical Problem

In view of this, embodiments of the present disclosure provide a method of interconnecting between network applications and a type of network access apparatus, which aims at solving the problem in the related art that the there is strong coupling between the manner of interconnection between network applications, and the network address, and the Port Number, the network address is difficult to be acquired, and the Port Number cannot be identified.

Technical Solution

In one aspect, embodiments of the present disclosure provide a method of interconnecting between network applications, including: acquiring a network address and a network application Port Number of a first network device and first validation information; receiving a network address and an application Port Number of a second network device and second validation information according to the network address and the network application Port Number of the first network device and the first validation information; validating whether the network address and the application Port Number of the second network device is connection information requested by the network application of the first network device according to the second validation information; and connecting the network application of the first network device with the network application of the second network device according to the network address and the network application Port Number of the second network device, if the network address and the network application Port Number of the second network device is the connection information requested by the network application of the first network device.

In a second aspect, the embodiments of the present disclosure provide another method of interconnecting between network applications, including: acquiring a network address and a network application Port Number of a first network device, first validation information and a network application Port Number of the second network device; transmitting the network address and the network application Port Number of the first network device and the first validation information to a network application of the second network device according to the network application Port Number of the second network device; transmitting second validation information to the network application of the first network device and connecting with the network application of the first network device by the network application of the second network device according to the network address and the network application Port Number of the first network device; and determining that a connection from the network application of the second network device is allowed by the network application of the first network device, if authentication of the second validation information is passed by the network application of the first network device.

In a third aspect, embodiments of the present disclosure provide a type of network access apparatus, including: a network access module, a directional signal transmission module, and/or a directional signal receiving module, and a network application port storage module; where the network access module is configured to access the network and acquire a network address of the network device from the network; the directional signal transmission module is configured to transmit a directional communication signal, where the directional communication signal includes a network address and a network application Port Number of the first network device, network application identification information of the second network device and first validation information; the directional signal receiving module is configured to receive a directional communication signal sent by a directional signal transmission module of other network access apparatus; the network application port storage module is configured to store a correspondence relationship between the identification information and the Port Number of the network application executed on the network device.

In a fourth aspect, embodiments of the present disclosure provide a network terminal device, including: a memory, a processor and a computer program stored in the memory and executable on the processor, the processor is configured to implement steps in the aforesaid method of interconnecting between network applications, when executing the computer program.

In a fifth aspect, embodiments of the present disclosure provide a computer readable storage medium which stores a computer program, when the computer program is executed by a processor, steps in the aforesaid method of interconnecting between network applications are implemented.

Advantageous Effects

According to the embodiments in the present disclosure, the network address and the network application Port Number of the first network device and the first validation information are acquired, and the network address and the network application Port Number of the second network device are received, whether the network address and the network application Port Number of the second network device are the requested connection information is determined according to the second validation information, the connection with the network application of the second network device is performed if the network address and the network application Port Number of the second network device are the requested connection information, decoupling the network application connection request from the network address and the network application Port Number is implemented, the convenience of interconnection of network applications between different network devices is greatly improved, and an approach of enabling different network applications to be interconnected between different network devices is provided.

BRIEF DESCRIPTION OF THE DRAWINGS

In order to explain the embodiments of the present disclosure more clearly, a brief introduction regarding the accompanying drawings that need to be used for describing the embodiments of the present disclosure or the prior art is given below; it is apparent that the accompanying drawings described as follows are merely some embodiments of the present disclosure, the person of ordinary skill in the art may also acquire other drawings according to the current drawings on the premise of paying no creative labor.

DESCRIPTION OF THE EMBODIMENTS

Figure 1:
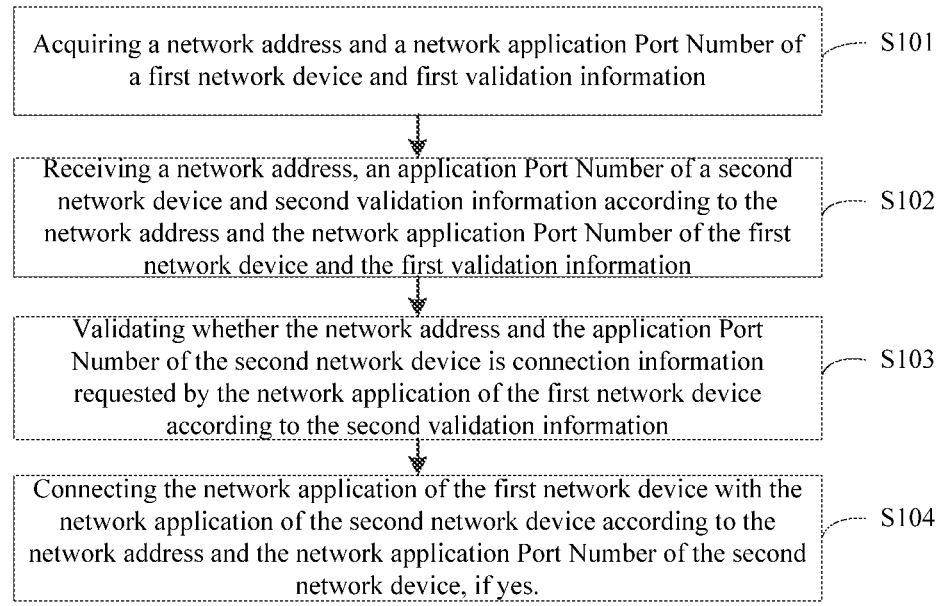
FIG. 1 illustrates a schematic diagram of implementation process of one method of interconnecting between network applications according to an embodiment of the present disclosure.

In order to make the purpose, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure. It should also be further understood that, terms of "comprising/including" and any modification thereof in the description, claims and the aforesaid accompanying drawings are intended to cover non-exclusive inclusion. In addition, terms of "first", "second", and "third" are configured to distinguish different objects rather than describing a particular order. In order to describe the technical solutions in the present disclosure, the technical solutions are described with reference to detailed embodiments below:

Referring to FIG. 1, FIG. 1 illustrates a schematic diagram of an implementation process of a method of interconnecting between network applications according to an embodiment of the present disclosure, this method may realize interconnection of the same network application or different network applications in different network devices. The method includes:

In a step of S101, acquiring a network address and a network application Port Number of the first network device, and first validation information.

In this embodiment, the network address of the first network device may be a network address of a network device which initiates network connection, and the network address may be acquired according to the network accessed by the network device which initiates network connection; the accessed network may be one or more networks selected from the group consisting of the Internet, the local area network, the mobile network, but are not limited to these networks described above; the acquired network address may be but is not limited to one or more network addresses from the group consisting of IP (Internet Protocol) address, domain name address, username, and account number. The network application Port Number of the first network device may be a Port Number corresponding to a network application executing on the network device which initiates network connection; the executed network application may be a FTP (File Transfer Protocol) network service, and may also be a standard network application such as WWW (World Wide Web) network service.

Further, acquiring the network address and the network application Port Number of the first network device, and the first validation information includes: A1, acquiring connection request information, where the connection request information includes network application identification information of the first network device, network application identification information of the second network device and first validation information.

In this embodiment, the connection request information is sent by the network application of the network device which initiates network connection, the network application identification information of the first network device may be identification information corresponding to the network application of the network device which initiates network connection, the network application identification information of the second network device may be the identification information corresponding to the network application of the network device requested to be connected, the first validation information may be the validation information generated by the network application of the network device which initiates network connection. The network address and the network application Port Number are not included in the connection request information, so that decoupling the network application connection request from the network address and the network application Port Number is realized.

A2, querying a network application Port Number of the first network device according to the network application identification information of the first network device, and acquiring a network address of the first network device according to access network.

In this embodiment, the Port Number of the network application of the first network device may be a Port Number of a network application of the network device which initiates network connection, the network address of the first network device may be a network address of the network device which initiates network connection, the network application identification information is associated with and corresponding to the Port Number of the network application, the Port Number of the network application is acquired by the identification information, and the network address of the network device is acquired through the access network. It needs to be noted that the network application of the network device has corresponding identification information, the identification information is used to identify the network application, and the identification information has uniqueness.

In a step of S102, receiving a network address and a network application Port Number of the second network device and second validation information according to the network address and the network application Port Number of the first network device, and the first validation information.

In this embodiment, the second network device network address may be a network address of a connected network device, the network application Port Number of the second network device may be a network application Port Number of the connected network device, the second validation information may be validation information generated by the network access apparatus of the connected network device and is associated with the first validation information.

Furthermore, receiving the network address and the network application Port Number of the second network device and the second validation information according to the network address and the network application Port Number of the first network device and the first validation information includes: transmitting the network address and the network application Port Number of the first network device, the network application identification information of the second network device and the first validation information to the second network device in the form of directional communication signal.

In this embodiment, the network address of the first network device, the network application Port Number of the first network device, the network application identification information of the second network device, and the first validation information need to be transmitted to the second network device in the form of directional communication signal.

In a step of S103, validating whether the network address and the network application Port Number of the second network device are connection information requested by the network application of the first network device according to the second validation information.

In this embodiment, the second validation information may be validation information generated by the network access apparatus of the connected network device and is associated with the first validation information, and the network application Port Number of the second network device may be a network application Port Number of the connected network device. It needs to be noted that, the second validation information is used to determine whether the network address and the network application Port Number of the second network device as returned is the connection information requested by the network application of the first network device, after the first validation information is received by the second network device, the second validation information may be directly returned without modification of the first validation information, contents may be added on the basis of the first validation information, which ensures that the network device which initiates network connection can determine the network address and the network application Port Number of the second network device as the connection information requested by itself according to the second validation information, fraudulent feedback information and potential safety hazard are avoided.

In a step of S104, connecting the network application of the first network device with the network application of the second network device according to the network address and the network application Port Number of the second network device.

In this embodiment, when network connection between network applications is established, there are specifically two conditions, in the first condition, a network application A in a network device A requests to be connected to a network application A in a network device B, the network device B transmits a network address "106.14.1.12" of network device B, a Port Number "4321" of the network application A in the network device B and the second validation information "123456" to the network device A through the network according to the network address "106.14.1.11" and the Port Number "3321" of network application A in the network device A; the network application A in the network device A determines whether the network address "106.14.1.12" and the Port Number "4321" are the connection information requested by itself according to the second validation information "123456", the network application A in the network device A is connected to the network application A in the network device B according to the network address "106.14.1.12" and the Port Number "4321" if the network address "106.14.1.12" and the Port Number "4321" are the connection information requested by the network application A in the network device A; the connection between the network application A in the network device A and the network application A in the network device B is not performed if the network address "106.14.1.12" and the Port Number "4321" are not the connection information requested by the network application A in the network device A; in the second condition, a network application B in the network device A requests to be connected to WWW network service provided by the network application A in the network device B, the network device B transmits the network address "106.14.1.12" and the Port Number "4322" of network application A in the network device B that provides WWW network service and the second validation information "234567" to the network device A through the network according to the network address "106.14.1.12" of the network device A and the Port Number "3323" of the network application B in the network device A; the network application B in the network device A determines whether the network address "106.14.1.12" and the Port Number "4322" are the connection information requested by itself; the network application B in the network device A is connected to the WWW network service provided by the network application A in the network device B according to the network address "104.14.1.12" and the Port Number "4322" if the network address "106.14.1.12" and the Port Number "4322" are the connection information requested by the network application B in the network device A, the connection between the network application B in the network device A and the network application A in the network device A is not performed if the network address "106.14.1.12" and the Port Number "4322" are not the connection information requested by the network application B in the network device A.

Figure 2:
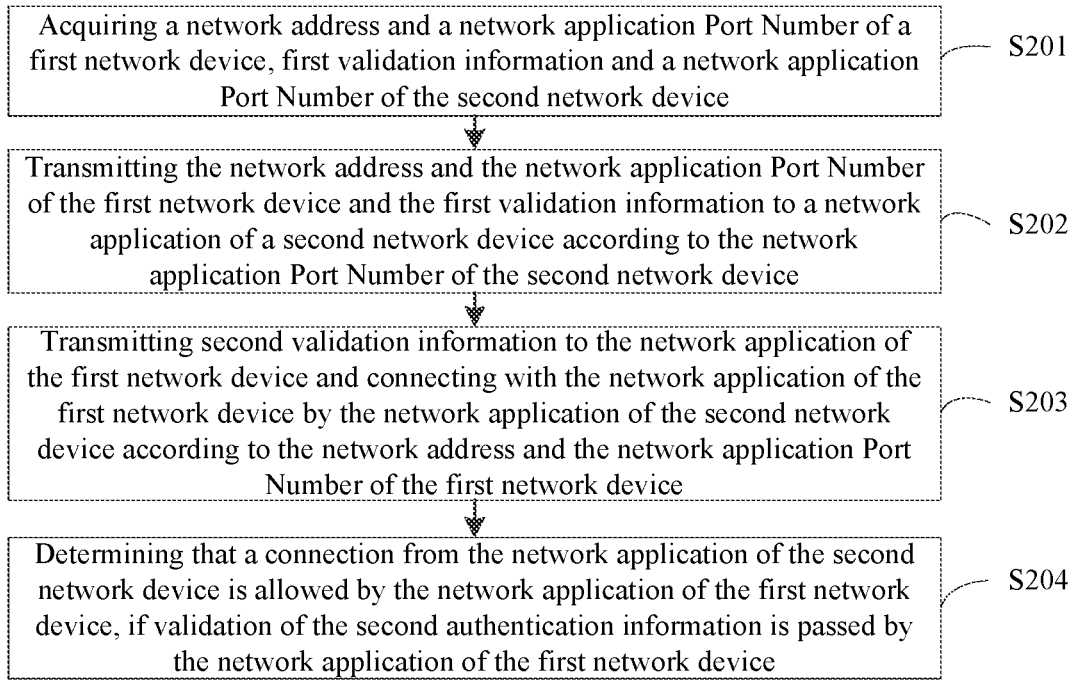
FIG. 2 illustrates a schematic diagram of implementation process of another method of interconnecting between network applications according to the embodiment of the present disclosure.

Referring to FIG. 2, FIG. 2 illustrates a schematic diagram of implementation of another method of interconnecting between network applications provided by an embodiment of the present disclosure, this method may enable the same network application to be interconnected between different network devices or enable different network applications to be interconnected between different network devices. The method includes:

In a step of S201, acquiring a network address of a first network device, a network application Port Number of the first network device, first validation information and a network application Port Number of a second network device.

In this embodiment, the network address of the first network device may be a network address of a network device which initiates network connection, the network application Port Number of the first network device may be a network application Port Number of the network device which initiates network connection, the first validation information may be the validation information generated by the network application of the network device which initiates network connection, the network application Port Number of the second network device may be a network application Port Number of the connected network device. In addition, the network supported in this embodiment and the services provided by the network application have been specifically described in step 101, it is not repeatedly described herein.

Furthermore, acquiring the network address and the network application Port Number of the first network device, the first validation information and the network application Port Number of the second network device includes: B1, receiving the network application identification information of the second network device; B2, querying the network application Port Number of the second network device according to the network application identification information of the second network device.

In this embodiment, the network application identification information of the second network device may be identification information of the network application of the network device requested to be connected, the network application Port Number of the second network device may be a Port Number of the network application requested to be connected, the connected device queries the Port Number of the network application requested to be connected according to the network application identification information of the network device requested to be connected.

In a step of S202, transmitting the network address and the network application Port Number of the first network device, and the first validation information to the network application of the second network device according to the network application Port Number of the second network device.

In this embodiment, the network address of the first network device may be a network address of the network device which initiates network connection, the network application Port Number of the first network device may be a network application Port Number which initiates the connection request, the network application of the second network device may be a network application of the connected network device, the connected network device transmits the network address of the network device which initiates network connection, the Port Number of the network application which initiates the connection request, and the first validation information to the network application which is requested to be connected.

In a step of S203, transmitting the second validation information to the network application of the first network device and connecting with the network application of the first network device by the network application of the second network device according to the network address of the first network device and the network application Port Number of the first network device.

In this embodiment, the network application Port Number of the first network device may be the network application Port Number which initiates the request, the network application of the first network device may be the network application which initiates the request, the second validation information may be the validation information generated by the network application of the connected network device and is associated with the first validation information; the network application requested to be connected transmits the second validation information to the network device which initiates network connection through the network, and is connected to the network application which initiates the request according to the network address of the network device which initiates network connection and the Port Number of the network application which initiates the request.

In a step of S204, determining that the network application of the first network device allows connection request from the network application of the second network device, if authentication of the second validation information is passed by the network application of the first network device.

In this embodiment, the network application of the first network device may be a network application which initiates the request, the network application which initiates the request determines whether to allow the connection request according to the second validation information, if the second validation information is verified by the network application which initiates the request, it is determined that the network application which initiates the request allows the connection request of the network application of the connected network device.

In this embodiment, when a network connection between network applications is established, two conditions may be divided.

In the first condition, a network application A in a network device A requests to connect to a network application A in a network device B, the network device B transmits the network address "106.14.1.11" of the network device A, Port Number "3321" of the network application A in the network device A, and the first validation information "123456" to the network application A in the network device B according to the Port Number "4321"; the network application A in the network device B transmits the second validation information "123456" to the network device A according to the network address "106.14.1.11" of the network device A and the Port Number "3321" of the network application A in the network device A, and is connected to the network application A in the network device A; the network application A in the network device A determines whether to allow the connection according to the second validation information "123456"; in the second condition, the network application B in the network device A requests to be connected to WWW network service provided by the network application A in the network device B, the network device B transmits the network address "106.14.1.11" of the network device A, the Port Number "3323" of the network application B in the network device A and the first validation information "234567" to the WWW network service provided by the network application A in the network device B according to the Port Number "4322"; the WWW network service provided by the network application A in the network device B transmits the second validation information "234567" to the network device A, and is connected to the network application B in the network device A according to the network address "106.14.1.11" and the Port Number "3323" of the network application B in the network device A; the network application A in the network device A determines whether to allow the connection according to the second validation information "234567".

According to this embodiment, when interconnection of network applications is performed, the directional communication signal is adopted to select the network device to be connected, the traditional method of using the network address to select the network device to be connected is avoided, the connection request of the network application is decoupled from the network address; the identification information is adopted to represent the network application, and dynamic analysis work between the identification information and the network application Port Number is encapsulated outside the network application, decoupling the connection request of the network application from the Port Number is realized. By decoupling the connection request of the network application from the network address and the Port Number, the convenience of interconnection of the network applications between different network devices is greatly improved, and a concept that "being connected when it is seen" is realized in combination with the directional communication technology; an approach of enabling different network devices to be interconnected between different network devices is also provided, and data exchange between different network application platforms is further realized.

It should be understood that, the value of serial number of the steps in the aforesaid embodiment doesn't mean a sequencing of execution sequences of the steps, the execution sequence of each of the steps should be determined by functionalities and internal logics of the steps themselves, and shouldn't be regarded as limitation to an implementation process of the embodiment of the present disclosure.

Figure 3:
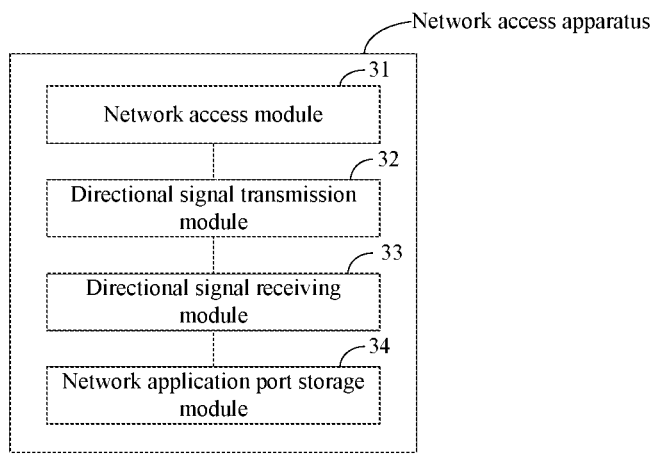
FIG. 3 illustrates a schematic diagram of a type of network access apparatus according to an embodiment of the present disclosure.

Referring to FIG. 3, FIG. 3 illustrates a schematic structural diagram of a type of network access apparatus provided by an embodiment of the present disclosure, for the convenience of illustration, the part related to this embodiment of the present disclosure is merely illustrated. The network access apparatus is applied to interconnection of the same network application between different network devices or interaction of different network applications between different network devices.

The network access apparatus is used for a network device which initiates network connection or a connected network device; when the network access apparatus is applied to the network device which initiates network connection, connection request information for connecting to a network application of other network device which is sent by the network application executing on the network device may be received, the connection request information includes the network application identification information which initiates the request, the identification information and the validation information of the network application requested to be connected; when the network access apparatus is applied to the connected network device, the network connection with the network access apparatus of the network device which initiates network connection may be established through the network according to the network address of the network device which initiates network connection, the Port Number of the network application which initiates the request, the Port Number of the network application which is requested to be connected and the validation information.

As shown in this figure, the network access apparatus includes:

a network access module 31, a directional signal transmission module 32, a directional signal receiving module 33, and a network application port storage module 34.

Figure 14:
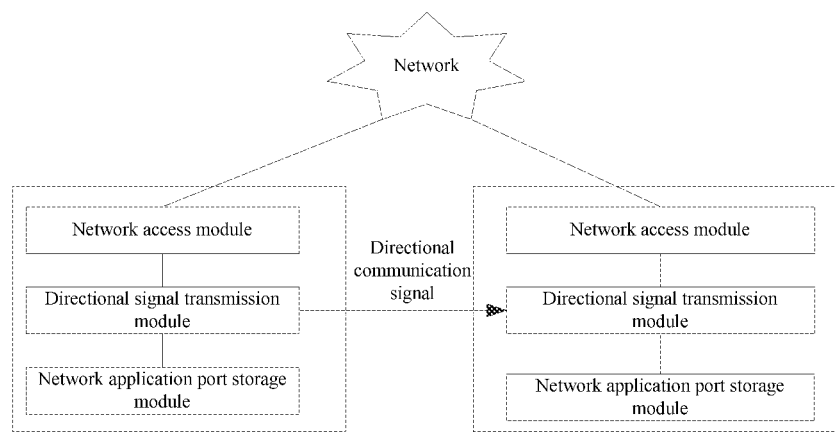
FIG. 14 illustrates a schematic structural diagram of network connection of the network access apparatus according to an embodiment of the present disclosure.

Where, the network access apparatus shown in FIG. 14 may include one or both of the directional signal transmission module 32 and the directional signal receiving module 33 so as to implement one or both functions of transmitting and receiving directional communication signal. When one of said network access apparatus only needs to transmit a directional communication signal, the network access apparatus may only include the directional signal transmission module, and the directional signal receiving module is not included; when one of said network access apparatus only needs to receive the directional communication signal, this network access apparatus may only include the directional signal receiving module, and the directional signal transmission module is not included.

Figure 4:
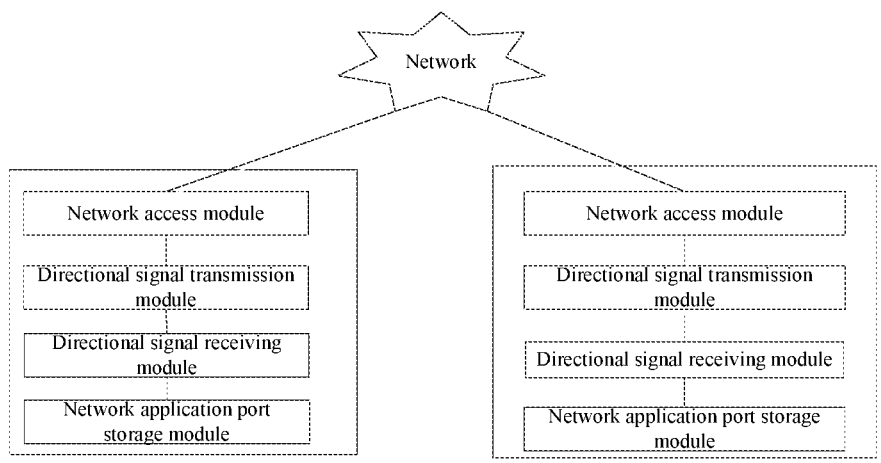
FIG. 4 illustrates a schematic diagram of functionality of a network access module according to an embodiment of the present disclosure.

The network access module 31 is configured to access the network and acquire the network address of the network device from the network, as shown in FIG. 4, the network access module 31 is further configured to perform data transmission with other network access modules through the network; the network access module 31 may be but is not limited to a network card, a Wi-Fi module and a mobile network module.

The directional signal transmission module 32 is configured to transmit the directional communication signal including the network address of the first network device, the network application port of the first network device, the network application identification information of the second network device and first validation information; The directional signal transmission module 32 is further configured to query a Port Number of the network application which initiates the request from the network application port storage module 34 based on the identification information of the network application which initiates the request; the directional signal transmission module 32 is further configured to acquire the network address of the network device which initiates network connection from the network access module 31; as shown in FIG. 5, the directional signal transmission module 32 is further configured to transmit the network address of the network device which initiates network connection, the Port Number of the network application which initiates the request, the identification information of the network application requested to be connected, and the validation information to the directional signal receiving module 33 of the connected network device in the form of directional communication signal.

Figure 7:
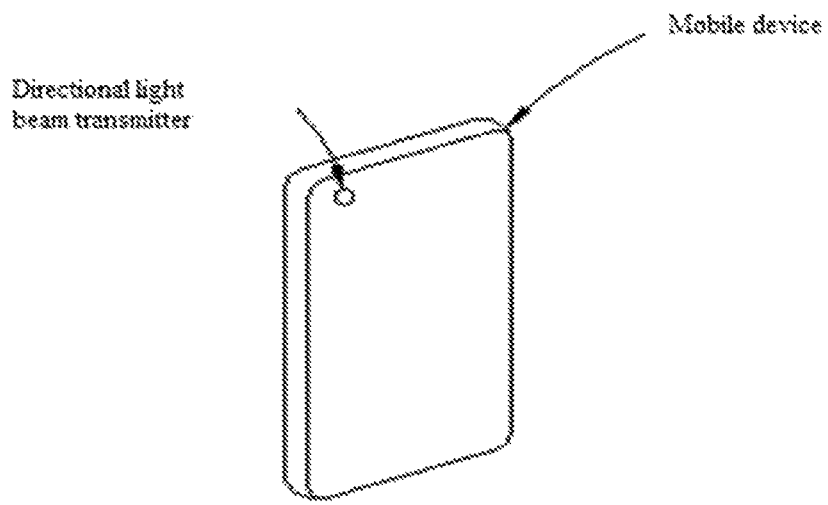
FIG. 7 illustrates a schematic diagram of arranging a directional signal transmission module in a mobile device according to an embodiment of the present disclosure.

Additionally, the directional signal transmission module 32 may transmit the directional communication signal using an LED (Light Emitting Diode) light source emitting device or a laser emitting device. As shown in FIG. 7, a directional light beam transmitter may be arranged on various network devices in order to transmit the directional communication signal, the network device may be such as a mobile device; the directional communication signal is an optical communication signal having strong directivity, and may also be such as a directional infrared beam carrying a signal, a directional visible light beam or a directional ultraviolet light beam; the directional signal transmission module 32 may carry signal by modulating the intensity of the directional infrared light beam, the directional visible light beam or the directional ultraviolet light beam; the modulation may be frequency modulation or amplitude modulation; the directional signal transmission module 32 may be modulated by directly or indirectly modulating an optical transmitter.

Figure 5:
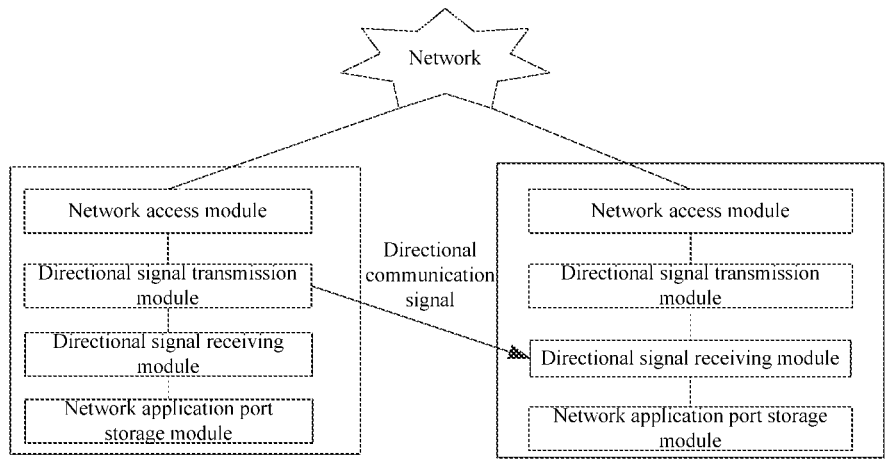
FIG. 5 illustrates a schematic diagram of functionalities of a directional signal transmission module and a directional signal receiving module according to an embodiment of the present disclosure.

The directional signal receiving module 33 is configured to receive a directional communication signal sent by the directional signal transmission module 32 of other network access apparatus; as shown in FIG. 5, the directional signal receiving module 33 is further configured to establish a network connection with the network access apparatus of the network device which initiates network connection through the network according to the network address of the network device which initiates network connection, the Port Number of the network application which initiates the request, the Port Number of the network application requested to be connected and the validation information. In addition, the directional signal receiving module 33 is configured to detect the directional communication signal through the current generated by light beam on the photoelectric induction film; the photoelectric inducing film has photoelectric conversion capability; and the photoelectric induction film may be affixed on the surface of the network device.

Figure 15:
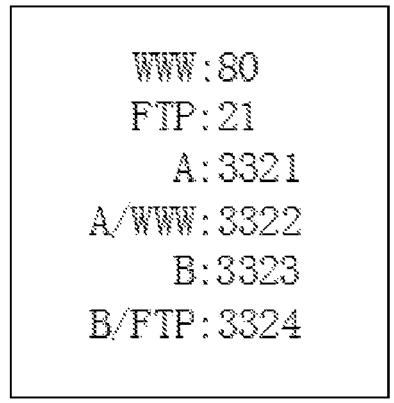
FIG. 15 illustrates a schematic diagram of a network application port storage module according to an embodiment of the present disclosure.

The network application port storage module 34 is configured to store the correspondence relationship between the identification information and the Port Number of the network application executing on the network device; as shown in FIG. 15, identification information "WWW" corresponds to a Port Number 80, identification information "FTP" corresponds to the Port Number 21, identification information "A" corresponds to a Port Number 3321. The network application port storage module may be a storage module of the network device such as a memory, a magnetic disk, a memory card and the like of the network device.

Furthermore, the directional signal receiving module 33 includes a photoelectric inducing film, where the photoelectric induction film is attached on the surface of the network device and is configured to detect the directional communication signal; the photoelectric induction film may realize photoelectric conversion; and the photoelectric induction film may be a transparent or semi-transparent or non-transparent film.

Figure 6:
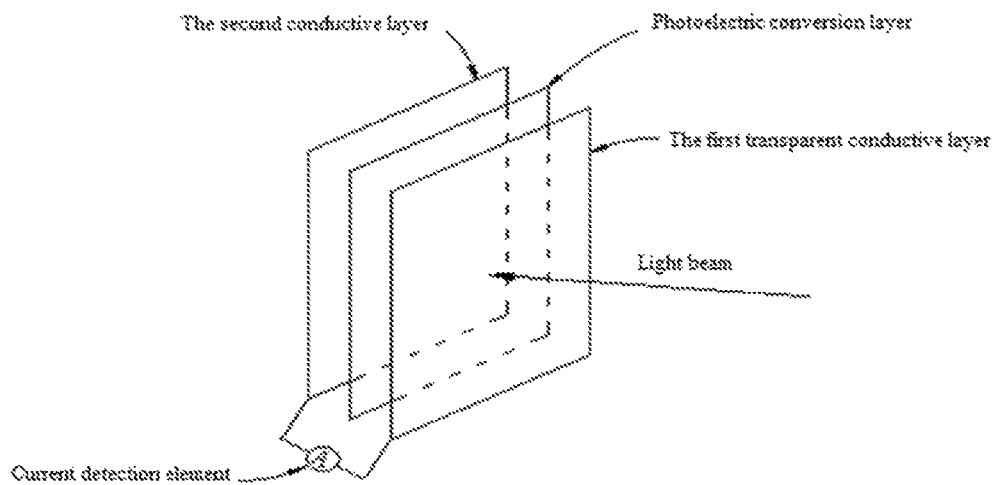
FIG. 6 illustrates a schematic structural diagram of a photoelectric induction film according to an embodiment of the present disclosure.

Furthermore, as shown in FIG. 6, the photoelectric induction film includes a first transparent conductive layer, a photoelectric conversion layer and a second conductive layer, the photoelectric conversion layer is arranged between the first transparent conductive layer and the second conductive layer; the directional communication signal is detected by the current generated by light beam on the photoelectric induction film, that is, the current is detected by a current detection element between the first transparent conductive layer and the second conductive layer, and the directional communication signal is detected by an ADC (Analog to Digital Conversion) module.

The first transparent conductive layer may be a transparent metal film, a transparent metal oxide film, a transparent graphene film, or a transparent carbon nanotube film or a transparent film based on conductive polymer material; the second conductive layer may be a non-transparent or semi-transparent, or transparent conductive layer; the second conductive layer may be a metal film, a metal oxide film, a graphene film or a transparent carbon nanotube film, or a thin film based on conductive polymer material; the photoelectric conversion layer is provided with photoelectric conversion capability, and may be such as a film made of semiconductor photovoltaic material, the current detection element may also be used in series with a capacitor, an intensity fluctuation of irradiated light beam is detected by detecting AC (Alternating Current), then, the directional communication signal is detected through the ADC module; regarding the current detection element, a current detection element based on detection resistor, current transformer, Rogowski coil or Hall effect device may be adopted.

Figure 8:
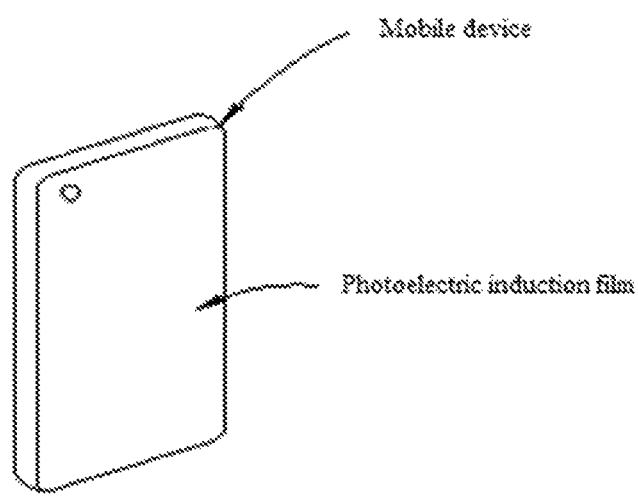
FIG. 8 illustrates a schematic diagram of affixing a photoelectric induction film with the mobile device according to an embodiment of the present disclosure.
Figure 9:
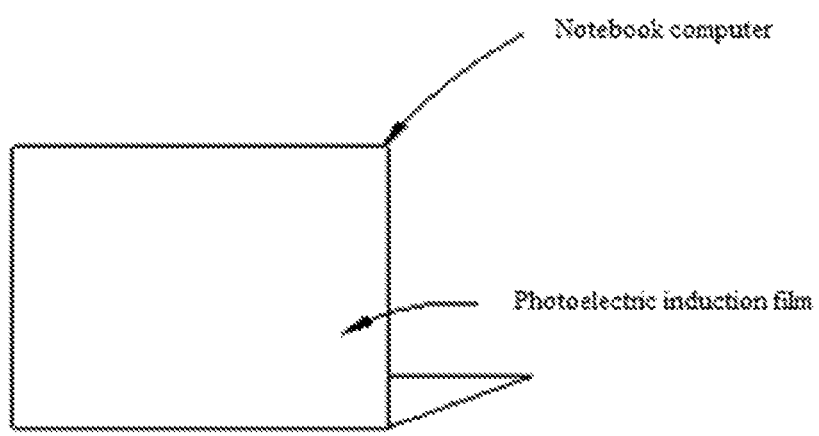
FIG. 9 illustrates a schematic diagram of affixing the photoelectric induction film with a notebook computer according to an embodiment of the present disclosure.
Figure 10:
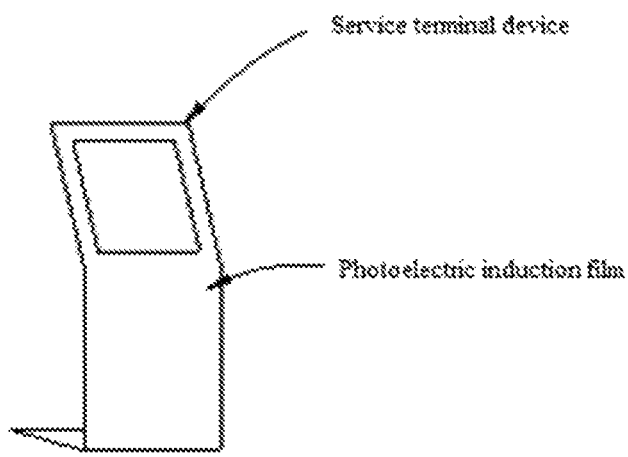
FIG. 10 illustrates a schematic diagram of affixing the photoelectric induction film with a service terminal device according to an embodiment of the present disclosure.

Additionally, a non-transparent or semi-transparent semiconductor photovoltaic material may be used as the photoelectric conversion layer in the photoelectric induction film, the photoelectric conversion layer may be such as a photoelectric conversion layer based on monocrystalline silicon, polysilicon, amorphous silicon, cadmium telluride, copper indium gallium selenide, copper zinc tin sulfur, copper zinc tin selenium, copper indium selenium, gallium arsenide, organic semiconductor, perovskite, the photoelectric induction film is completely non-transparent or partially transparent in the visible light region. As shown in FIG. 8, FIG. 9, and FIG. 10, the photoelectric induction film may be affixed on the surface of the network device such as a mobile device, a notebook computer and a service terminal device, so that the surface of the network device becomes a receiving end of the directional communication signal.

Figure 11:
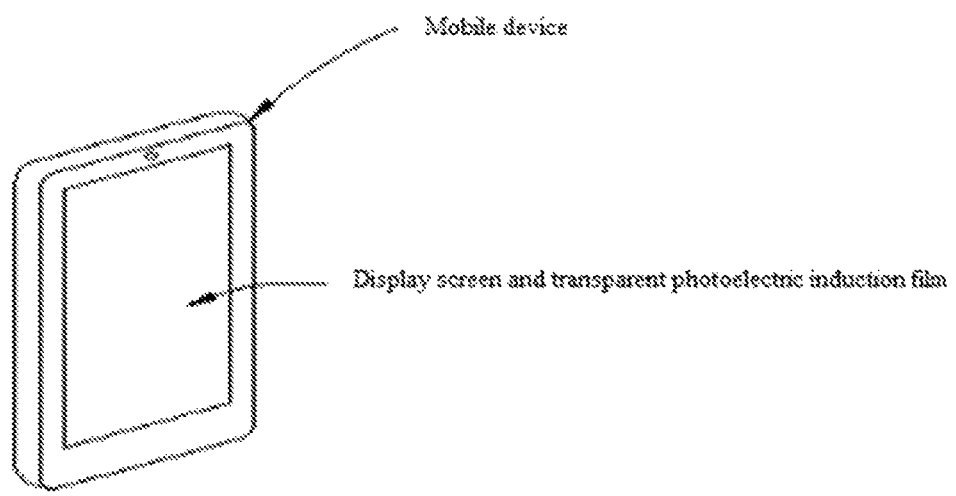
FIG. 11 illustrates a schematic diagram of affixing a transparent photoelectric induction film with the mobile device according to an embodiment of the present disclosure.
Figure 12:
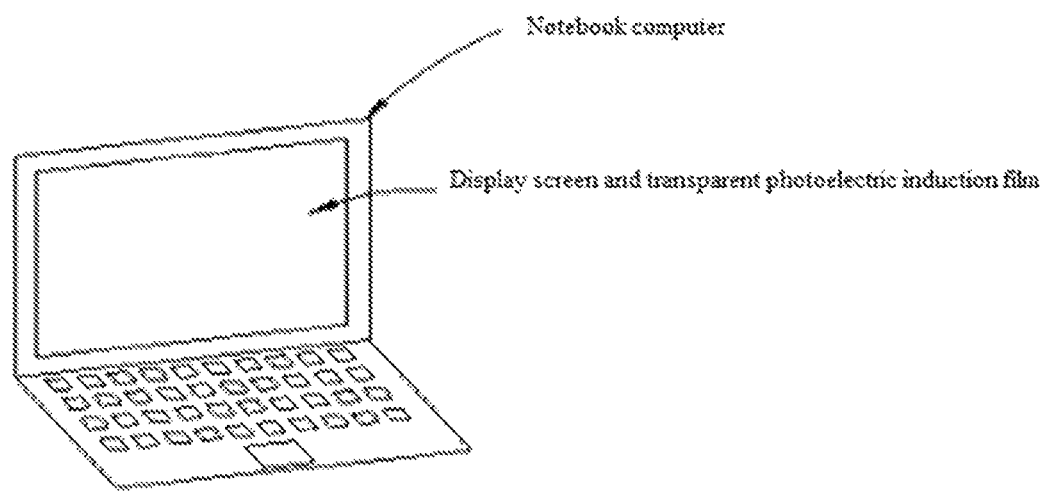
FIG. 12 illustrates a schematic diagram of affixing the transparent photoelectric induction film with a notebook computer according to an embodiment of the present disclosure.
Figure 13:
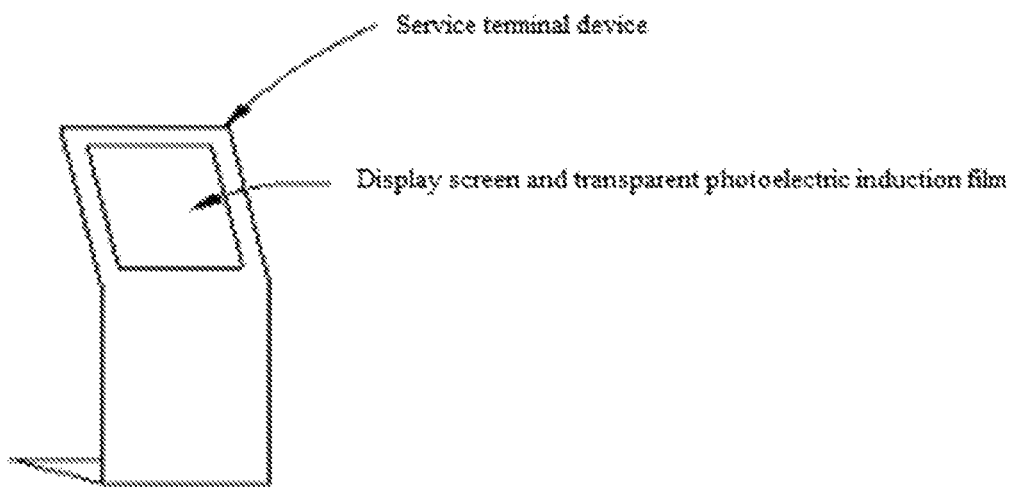
FIG. 13 illustrates a schematic diagram of affixing the transparent photoelectric induction film with a service terminal device according to an embodiment of the present disclosure.

A transparent conductive layer may also be used as the first transparent conductive layer and the second conductive layer in the photoelectric induction film, the transparent conductive layer may be such as a metal silver-based transparent conductive layer, or a grid-shaped transparent conductive layer based on metal silver wire, or a transparent conductive layer based on tin oxide or based on zinc oxide, or a transparent conductive layer based on metal copper wire, or a transparent conductive layer based on silver nanowire, or a transparent conductive layer based on carbon nanotube, or a grapheme based transparent conductive layer, or a transparent conductive layer based on conductive high polymer such as poly (3, 4-ethylenedioxythiophene) and polystyrenesulfonic acid; the photoinduced film may also use a transparent semiconductor photovoltaic material such as the photoelectric conversion layer based on aluminum phthalocyanine/carbon 60, PBDTT-DPP/PCBM, or perovskite film as the photoelectric conversion layer, and the photoelectric induction film has high light transmittance in the visible light region. As shown in FIG. 11, FIG. 12, and FIG. 13, the photoelectric induction film has high transparency, and may be affixed on the surface of the network device, and the appearance of the network device such as the surface of the mobile device, the notebook computer, the display screen of the service terminal device, and other surfaces of the network device which has requirement on the appearance are not significantly changed.

According to the embodiment of the present disclosure, the photoelectric induction film is used as the receiving end of the directional communication signal and may be affixed on the surface of the network device, so that the surface of the network device becomes the receiving end of the directional communication signal, and it is more convenient to receive the directional communication signal. The photoelectric induction film may also be made of transparent material and has high transparency, such that the photoelectric induction film would not obviously change the appearance of the network device, and the photoelectric induction film has wider applicability.

Figure 16:
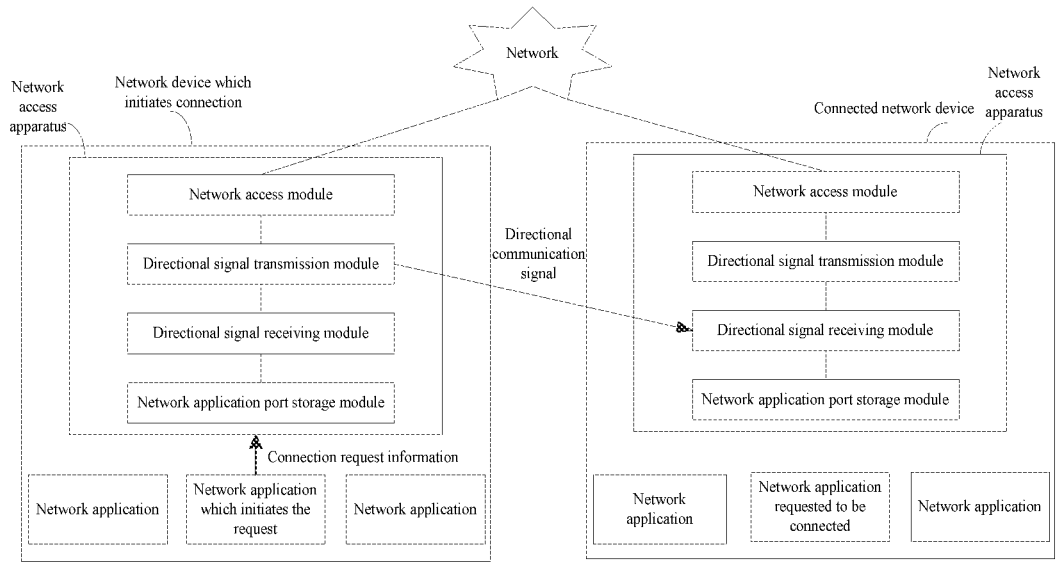
FIG. 16 illustrates a schematic diagram of network application connection request according to an embodiment of the present disclosure.

As shown in FIG. 16, the network access apparatus is configured to receive the connection request information for connecting with the network application of other network device which is initiated by the network application executing on the network device, and to transmit the network address of the network device which initiates network connection, the Port Number of the network application which initiates the request, the identification information and the validation information of the network application requested to be connected to the directional signal receiving module 33 of the connected network device through the directional signal transmission module 32 in the form of directional communication signal.

Figure 17:
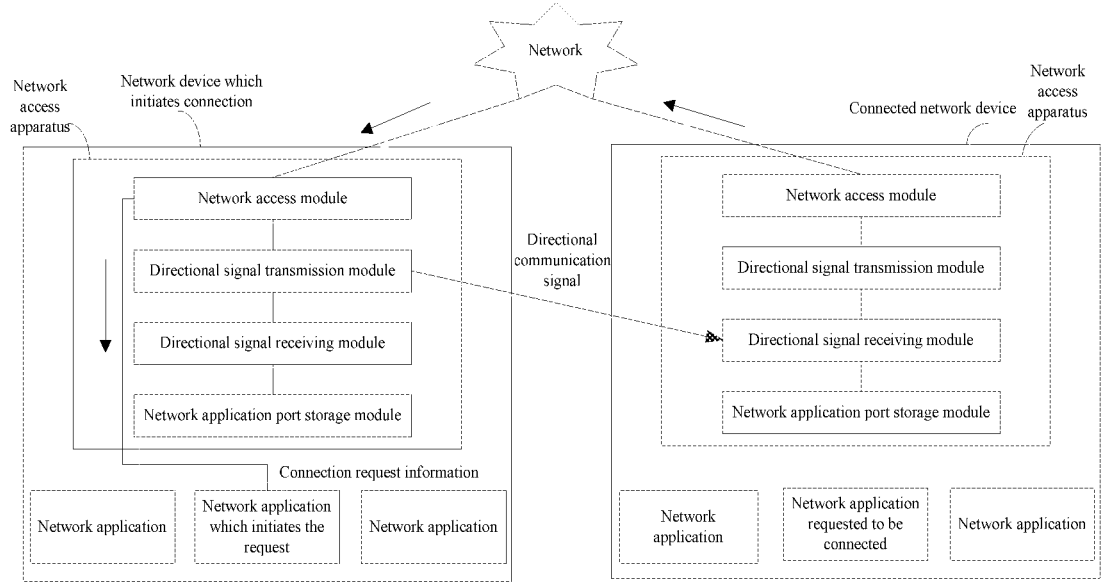
FIG. 17 illustrates a schematic diagram of responding to the network application connection request according to an embodiment of the present disclosure.
Figure 18:
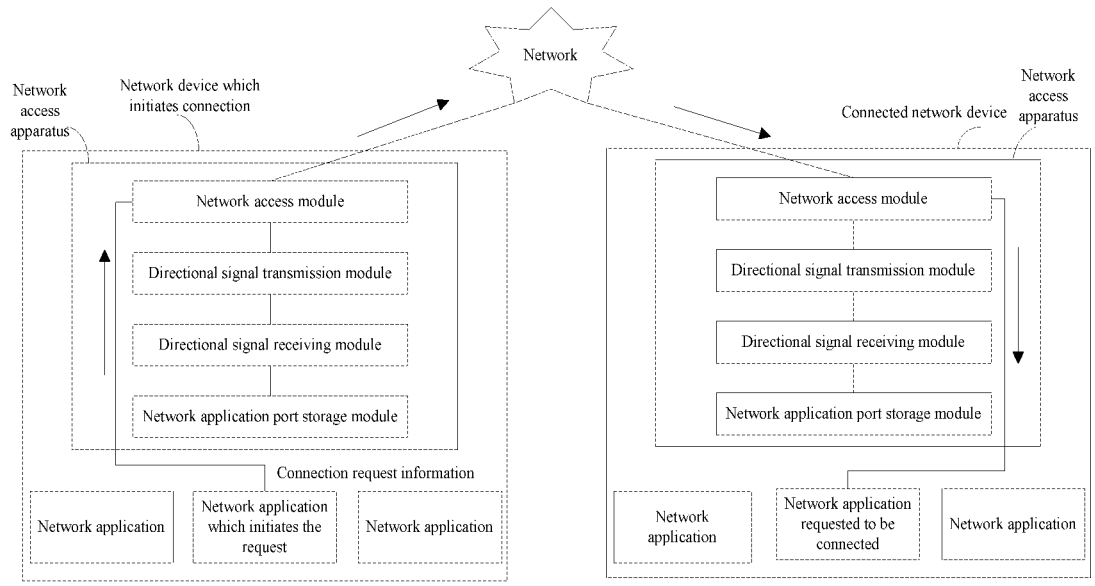
FIG. 18 illustrates a schematic diagram of connection of network applications according to an embodiment of the present disclosure.

As shown in FIG. 17, when the network connection is established through the network access apparatus, the network access module 31 of the connected network device transmits the network address of the connected network device, the Port Number and the validation information of the network application requested to be connected to the network device which initiates network connection through the network according to the network address of the network device which initiates network connection and the Port Number of the network application which initiates the request; the network application of the network device which initiates network connection determines whether the network address of the connected network device and the Port Number of the network application requested to be connected are the connection information requested by itself according to the validation information; the network application of the network device which initiates network connection utilizes the network address of the connected network device and the Port Number of the network application requested to be connected to connect to the network application requested to be connected through the network access module 31, if the network address of the connected network device and the Port Number of the network application requested to be connected are the connection information requested by the network application which initiates the request; the network connection is not performed, if the network address of the connected network device and the Port Number of the network application requested to be connected are not the connection information requested by the network application which initiates the request.

Figure 19:
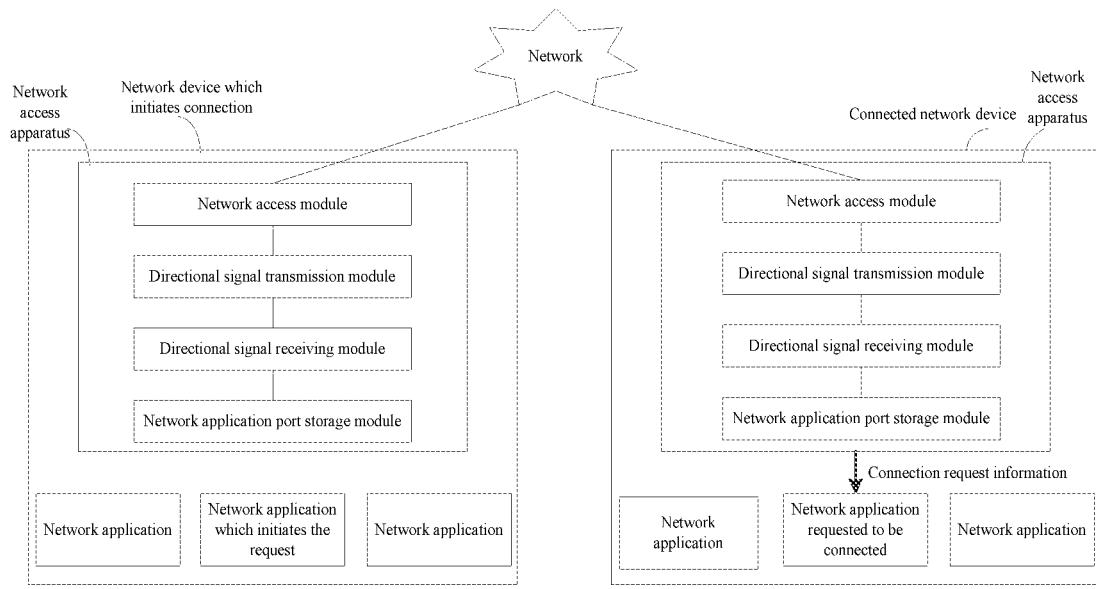
FIG. 19 illustrates a schematic diagram of forwarding of the network application connection request according to an embodiment of the present disclosure.
Figure 20:
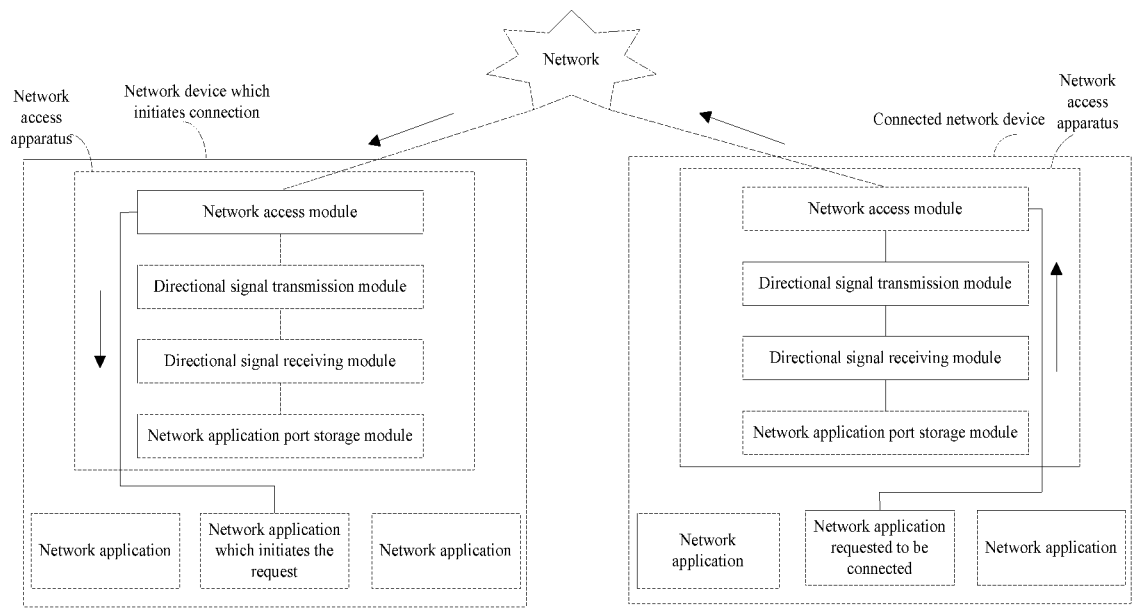
FIG. 20 illustrates a schematic diagram of connection after forwarding of the network application connection request according to an embodiment of the present disclosure.

As shown in FIG. 19, when the network connection is established through the network access apparatus, the network access apparatus of the connected network device transmits the network address of the network device which initiates network connection, the Port Number of the network application which initiates the request and the validation information to the network application requested to be connected according to the Port Number of the network application requested to be connected; as shown in FIG. 20, the network application which is requested to be connected transmits the validation information to the network device which initiates network connection through the network access module 31 according to the network address of the network address which initiates network connection and the Port Number of the network application which initiates the request, and is connected to the network application which initiates the request; the network application which initiates the request determines whether to allow the connection according to the validation information.

Particularly, the present disclosure is further described by taking the network application in the network device A is requested to connect to the network application in the network device B as an example.

The network access apparatus provided by the present disclosure is arranged in the network device A and the network device B respectively. The network access module 31 of the network device A accesses the network, and acquires a network address "106.14.1.11" from the network; the network access module 31 of the network device B accesses the network and acquires a network address "106.14.1.12" from the network. The network device A and the network device B execute the network application respectively and store the identification information and monitored Port Numbers of their respective network applications in their respective network application port storage modules 34, the identification information and the Port Numbers of the network applications are respectively shown as follows:

Network device A:

WWW: 80; FTP: 21; A: 3321; A/WWW: 3322; B: 3323; B/FTP: 3324;

Network device B:

WWW: 80; FTP: 21; A: 4321; A/WWW: 4322; B: 4323; B/FTP: 4324;

Where "WWW" represent the standard WWW network service, "FTP" represents the standard FTP network service, "A" represents the network application A, "A/WWW" represents the WWW network service provided by the network application A; "B" represents the network application B; "B/FTP" represents the FTP network service provided by the network application B.

Embodiment one, a network application A in a network device A requests to be connected to a network application A in a network device B, identification information "A" of the network application which initiates the request, identification information "A" of network application requested to be connected, and validation information "123456" need to be transmitted to the network access apparatus in the network device A. The directional signal transmission module 32 in the network device A queries the Port Number "3321" from the network application port storage module 34 in the network device A according to the identification information "A", and acquires the network address "106.14.1.11" of the network device A from the network access module 31 of the network device A. The directional signal transmission module 32 in the network device A transmits the Port Number "3321" of the network application A in the network device A, the identification information "A" of the network application requested to be connected and the validation information "123456" to a directional signal receiving module 33 of the network device B in the form of directional communication signal. The directional signal receiving module 33 in the network device B queries the Port Number "4321" from the network application port storage module 34 of the network device B according to the identification information "A" of the network application requested to be connected. The network access apparatus in the network device B establishes network connection with the network access apparatus of the network device A through the network according to the network address "106.14.1.11" of the network device A, the Port Number "3321" of the network application A in the network device A, the Port Number "4321" of the network application A in the network device B and the validation information "123456".

Embodiment two, the network application B in the network device A requests to be connected to the WWW network service provided by the network application A in the network device B, the identification information "B" of the network application which initiates the request, the identification information "A/WWW" of the network application requested to be connected and the validation information "234567" need to be transmitted to the network access apparatus in the network device A. The directional signal transmission module 32 in the network device A queries the Port Number "3323" from the network application port storage module 34 according to the identification information "B", and acquires the network address "106.14.1.11" of the network device A from the network access module 31 of the network device A. The directional signal transmission module 32 in the network device A transmits the network address "106.14.1.11" of the network device A, the Port Number "3323" of the network application B in the network device A, the identification information "A/WWW" of the network application requested to be connected, and the validation information "234567" to the directional signal receiving module 33 of the network device B in the form of directional communication signal. The directional signal receiving module 33 in the network device B queries the Port Number "4322" from the network application port storage module 34 in the network device B according to the identification information "A/WWW" of the network application requested to be connected. The network access apparatus of the network device B establishes network connection with the network access apparatus of the network device A through the network according to the network address "106.14.1.11" of the network device A, the Port Number "3323" of the network application B in the network device A, the Port Number "4322" of the network application A of the network device B that provides WWW network service, and the validation information "234567".

Figure 21:
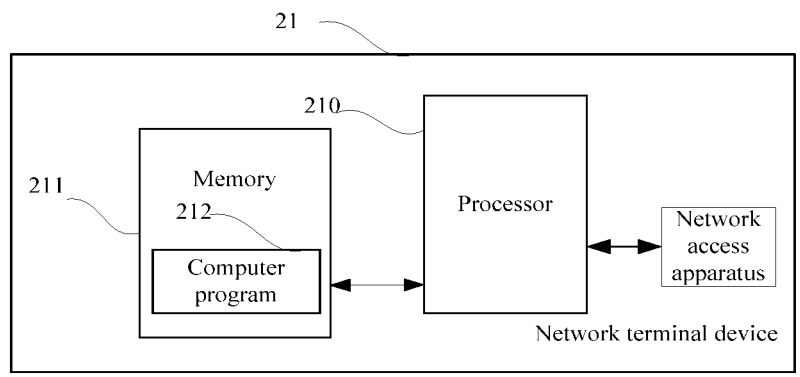
FIG. 21 illustrates a schematic diagram of a network terminal device according to an embodiment of the present disclosure.

FIG. 21 is a schematic diagram of a network terminal device 21 provided by an embodiment of the present disclosure. As shown in FIG. 21, the network terminal device 21 in this embodiment includes a type of network access apparatus, a processor 210, a memory 211, and a computer program 212 stored in the memory 211 and executable on the processor 210. The processor 210 is configured to implement the steps in the various method of interconnecting between network applications embodiments mentioned above when executing the computer program 212, such as the steps 101-104 shown in FIG. 1. The network access apparatus 21 may be a cloud computing device such as a desktop computer, a notebook computer, a palm computer, a cloud server, and the like. The network terminal device 21 may include but is not limited to the processor 210 and the memory 211. The person of ordinary skill in the art may understand that FIG. 21 is merely an example of the network terminal device 21 and is constituted as the limitation to the network terminal device 21, more or less components shown in FIG. 21 may be included, or some components or different components may be combined; for example, the network terminal device 21 may also include an input and output device, a type of network access apparatus, a bus, etc.

In one embodiment, the present disclosure further provides a computer readable storage medium, this computer readable storage medium may be computer-readable storage medium included in the memory of the embodiment mentioned above, and may also be computer readable storage medium which is independent and is not arranged in the terminal. The computer readable storage medium stores one or more programs, the one or more programs are used by one or more processors to perform information processing method including: acquiring the network address of the first network device, the network application Port Number of the first network device, and the first validation information;

receiving the network address and the network application Port Number of the second network device and the second validation information according to the network address and the network application Port Number of the first network device and the first validation information;

validating whether the network address and the network application Port Number of the second network device are connection information requested by the network application of the first network device according to the second verification information; and connecting the network application of the first network device with the network application of the second network device according to the network address and the network application Port Number of the second network device, if the network address and the network application Port Number of the second network device are the connection information requested by the network application of the first network device.

As stated above, the aforesaid embodiments are only intended to explain but not to limit the technical solutions of the present disclosure. Although the present disclosure has been explained in detail with reference to the above-described embodiments, it should be understood by the ordinary skilled one in the art that, the technical solutions described in each of the embodiments mentioned above can still be amended, or some technical features in the technical solutions may be replaced equivalently; these amendments or equivalent replacements, which doesn't cause the essence of the corresponding technical solution to be broken away from the spirit and the scope of the technical solution in various embodiments of the present disclosure, should all be included in the protection scope of the present disclosure.

What is claimed is:

1. A method of interconnecting between network applications performed on a network terminal device, comprising:
    acquiring a network address and a network application Port Number of a first network device and first validation information;
    receiving a network address and an application Port Number of a second network device and second validation information according to the network address and the network application Port Number of the first network device and the first validation information;
    validating whether the network address and the application Port Number of the second network device is connection information requested by the network application of the first network device according to the second validation information; and
    connecting the network application of the first network device with the network application of the second network device according to the network address and the network application Port Number of the second network device, if the network address and the network application Port Number of the second network device is the connection information requested by the network application of the first network device;
    wherein said receiving a network address and a network application Port Number of the second network device and second validation information according to the network address and the network application Port Number of the first network device and first validation information comprises:
    transmitting the network address and the network application Port Number of the first network device, the network application identification information of the second network device and the first validation information to the second network device in the form of directional communication signal.

2. The method of interconnecting between network applications according to claim 1, wherein said acquiring a network address and a network application Port Number of a first network device and first validation information comprises:
    acquiring connection request information, wherein the connection request information comprises network application identification information of the first network device, network application identification information of the second network device and the first validation information; and
    querying the network application Port Number of the first network device according to the network application identification information of the first network device, and acquiring the network address of the first network device according to access network.

3. The method of interconnecting between network applications according to claim 2, wherein the network application is corresponding to the identification information, the identification information is configured to identify the network application, and the identification information has uniqueness.

4. The method of interconnecting between network applications according to claim 1, wherein the network address of the first network device is the network address of the network device which initiates network connection, the method comprising: acquiring the network address according to the network accessed by the network device which initiates network connection.

5. The method of interconnecting between network applications according to claim 4, wherein the accessed network comprises one or more networks selected from the group consisting of Internet, local area network and mobile network.

6. A method of interconnecting between network applications performed on a network terminal device, comprising:
    acquiring a network address and a network application Port Number of a first network device, first validation information and a network application Port Number of a second network device;
    transmitting the network address and the network application Port Number of the first network device and the first validation information to a network application of the second network device according to the network application Port Number of the second network device;
    transmitting second validation information to the network application of the first network device and connecting with the network application of the first network device by the network application of the second network device according to the network address and the network application Port Number of the first network device; and
    determining that a connection from the network application of the second network device is allowed by the network application of the first network device, if authentication of the second validation information is passed by the network application of the first network device;
    wherein said acquiring a network address and a network application Port Number of the first network device, first validation information and a network application Port Number of the second network device comprises:
    receiving network application identification information of the second network device; and
    querying the network application Port Number of the second network device according to the network application identification information of the second network device.

7. The method of interconnecting between network applications according to claim 6, wherein the second validation information is validation information generated by a network application of the connected network device and is associated with the first validation information.

8. A network terminal device, comprising a memory, a processor and a computer program stored in the memory and executable on the processor, wherein the processor, when executing the computer program, is configured to:
    acquire a network address and a network application Port Number of a first network device and first validation information;
    receive a network address and an application Port Number of a second network device and second validation information according to the network address and the network application Port Number of the first network device and the first validation information;

validate whether the network address and the application Port Number of the second network device is connection information requested by the network application of the first network device according to the second validation information; and connect the network application of the first network device with the network application of the second network device according to the network address and the network application Port Number of the second network device, if the network address and the network application Port Number of the second network device is the connection information requested by the network application of the first network device;

wherein the processor is configured to receive the network address and the network application Port Number of the second network device and second validation information according to the network address and the network application Port Number of the first network device and first validation information by transmitting the network address and the network application Port Number of the first network device, the network application identification information of the second network device and the first validation information to the second network device in the form of directional communication signal.

* * * * *